United States Patent Office 3,501,357
Patented Mar. 17, 1970

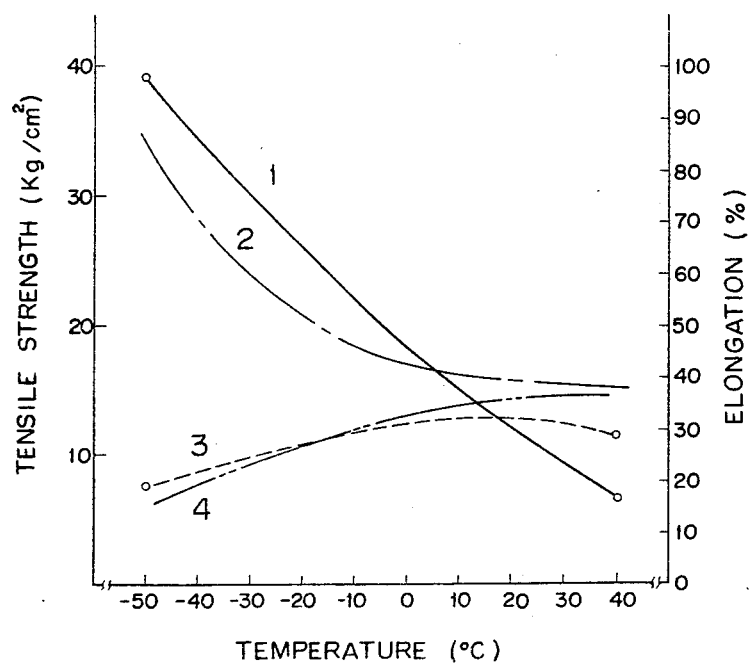

3,501,357
COMPOSITE PROPELLANTS CONTAINING BLOCK COPOLYMERS
Kenichi Suzuki, Saitama-ken, Saburo Minekawa, Yokohama-shi, Koretaka Yamaguchi, Kawasaki-shi, and Kazuo Toyomoto and Einosuke Fujimoto, Yokohama-shi, Japan, assignors to Asahi Kasei Kogyo Kabushiki Kaisha, Osaka, Japan
Filed Apr. 1, 1968, Ser. No. 717,556
Claims priority, application Japan, Apr. 12, 1967, 42/22,861
Int. Cl. C06d 5/00, 5/06
U.S. Cl. 149—19
10 Claims

ABSTRACT OF THE DISCLOSURE

A composite propellant comprising a fuel binder, oxidizer and, if desired, additives, said fuel binder mainly comprising a thermoplastic elastomer which is a block copolymer comprising conjugated diolefin blocks and vinyl-substituted aromatic hydrocarbon blocks and having a general formula selected from the group consisting of $(X-Y)_n$, $(X-Y)_n-X$ and $Y-(X-Y)_m$, wherein X represents a conjugated diolefin block, Y represents a vinyl-substituted aromatic hydrocarbon block, $n$ is an integer of 2–10, inclusive, and $m$ is an integer of 1–10, inclusive.

BACKGROUND OF THE INVENTION

Field of the invention

This invention relates to composite propellants using thermoplastic elastomers as fuel binders, and more particularly, it relates to a composite propellant using a block copolymer comprising conjugated diolefin blocks and vinyl-substituted aromatic hydrocarbon blocks as a fuel binder.

This invention also relates to a process for producing composite propellants using thermoplastic elastomers, particularly, a block copolymer comprising conjugated diolefin blocks and vinyl-substituted aromatic hydrocarbon blocks, as a fuel binder.

Description of the prior art

Heretofore, in the production of composite propellants consisting of a fuel binder mainly comprising synthetic resins or rubber, an oxidizer such as ammonium perchlorate or ammonium nitrate, and various burning-performance modifiers, normally, thermosetting high polymers have been used as fuel binders. For example, thermosetting plastics such as polyester resins, epoxy resins or the like were used in the past years, while rubbery elastomers, e.g. thermally cross-linking high polymers such as polysulfide, polyurethane, carboxylated polybutadiene or the like are used as fuel binders nowadays.

The propellants using these thermosetting high polymers mentioned above have advantages in that they have excellent mechanical properties as represented by the tensile strength of about 7–15 kg./cm.² and elongation of about 30–80% and that they have good burning stabilities as well as burning performances, as evidenced by the descriptions in U.S. Patent No. 3,050,423, Journal of Applied Polymer Science, 9, 1841 (1965) by J. C. Pott, etc. particularly in the one using aromatic polybutadiene as a main component of fuel binder which affords a specific impulse of 230–240 at a burning pressure of 50 kg./cm.².

However, these propellants have many disadvantages from standpoint of manufacturing technique. Namely, these propellants are normally obtained by first adding a curing or vulcanizing agent to a liquid low molecular weight fuel binder, further admixing oxidizer, burning-performance modifiers or the like therewith, then, after a thorough mixing and degassing, pouring the resulting mix into a mould or a rocket motor case according to the casting method, curing or vulcanizing the cast mix by heating, and cooling thus cured or vulcanized mix.

The heat-curing process involved in the series of operations described above normally requires a period of from 24 hours to about 10 days at a temperature of 60–100° C., and leads to disadvantages in prolonged manufacturing period and requirement for a considerable investment on the manufacturing facilities.

Moreover, in the heat-curing process, there is a danger of hazardous combustion or explosion due to accident in external heating or accumulation of heat of reaction. In addition, the shrinkage of the mix which occurs at the time of curing creates an internal stress within the propellant grain, giving rise to undesirable cracking thereof.

Furthermore, in the casting method adopted for casting these propellants, it is necessary that the slurry-like uncured propellant will have a high fluidity. However, for imparting a sufficiently high fluidity to the slurry-like propellant, the addition of solid components such as oxidizer, burning-performance modifier, etc., is restricted to rather insufficient amount, e.g. 85–88% by weight at the most, thus, the burning-performance inevitably is somewhat degraded.

On the other hand, there have been used heretofore some thermoplastic high polymers such as polyvinyl chloride, polyvinyl acetate or the like as fuel binders.

The propellants using these fuel binders have advantages in that they may be produced in procedures which can be worked inexpensively and suitably for mass-production, such as extrusion or injection method, and that they afford wider range for the mouldable composition.

However, such composite propellants as obtained according to the processes described in S.P.E. Journal, July 1963, pp. 637–641, U.S. Patents Nos. 2,966,403 and 3,107,186 do not have sufficient mechanical properties guaranteeing a stable combustion due to the fact that these high polymers used as fuel binders are essentially not rubbery elastomers having three-dimensional network structures.

Moreover, the heats of combustion of polyvinyl chloride and polyvinyl acetate which are 4,500 Kcal./kg. and 4,200 Kcal./kg., respectively, are far smaller than those of high polymers comprising hydrocarbons which normally run as high as 10,000 Kcal./kg., thus, there is obtained a propellant having only a poor burning-performance, e.g. in terms of specific impulse, by using such fuel binders mentioned above.

SUMMARY OF THE INVENTION

A first object of this invention is to provide a composite propellant having excellent mechanical properties, low temperature characteristics and burning stability by using a thermoplastic elastomer as a fuel binder.

A second object of this invention is to provide a composite propellant having an excellent burning-performance and capable of containing solid components in any optional compounding ratio.

A third object of this invention is to provide a process for manufacturing an excellent composite propellant free from internal stresses due to shrinkage at the time of curing.

A fourth object of this invention is to provide a process for manufacturing a composite propellant which may be worked safely, inexpensively and suitably for mass-production.

These objects of this invention mentioned above can now be accomplished by a composite propellent obtained by admixing a fuel binder mainly consisting of a block copolymer comprising conjugated diolefin blocks and vinyl-substituted aromatic hydrocarbon blocks, an oxidizer, a metal powder, a catalyst for adjusting burning rate and other additives together, and moulding the resulting mix.

The thermoplastic elastomers which may be used in this invention are those substantially comprising conjugated diolefin polymer blocks and vinyl-substituted aromatic hydrocarbon polymer blocks and they may be represented by the general formulae:

$$(X-Y)_n, (X-Y)_n-X \text{ or } Y-(X-Y)_m$$

wherein X represents a substantially conjugated diolefin polymer block, Y represents vinyl-substituted aromatic hydrocarbon polymer block, $n$ is an integer of 2–10, and $m$ is an integer of 1–10.

The thermoplastic elastomer of the general formulae shown above wherein $n$ is 1 or $m$ is zero exhibits no properties characteristic of an elastomer in an unvulcanized state, while when $n$ or $m$ is more than 11, inclusive its elastomeric properties are drastically deteriorated.

Preferable type of thermoplastic elastomers in this invention are those having $n$ of 2 and $m$ of 1. It is preferable that these thermoplastic elastomers may have average molecular weights ranging 10,000–500,000, and contain 10–70% by weight of vinyl-substituted aromatic hydrocarbons therein.

If the average molecular weight is less than 10,000, the mechanical strength of the resulting composite propellant is unsatisfactorily small, while that exceeding 500,000 leads to insufficient processability. Likewise, if the content of vinyl-substituted aromatic hydrocarbon is less than 10% by weight, the mechanical strength becomes small and that of more than 70% by weight results in poor elongation and degraded elastomeric properties, though the mechanical strength is increased.

The thermoplastic elastomers which may be used in this invention include polystyrene/polybutadiene/polystyrene block copolymer of Y—X—Y type obtained by polymerizing styrene using a monolithium hydrocarbon catalyst, copolymerizing the resulting active polystyrene with 1,3-butadiene, and further copolymerizing the resulting active polystyrene/polybutadiene block copolymer with styrene as described in U.S. Patent No. 3,265,765; polystyrene/polybutadiene/polystyrene block copolymer of Y—X—Y type obtained by coupling the above-mentioned active polystyrene/polybutadiene block copolymer with dialkenyl aromatic hydrocarbon or dihalogenated hydrocarbon as described in Belgian Patents Nos. 646,835 and 647,860; polystyrene/polybutadiene/polystyrene block copolymer of Y—X—Y type obtained by polymerizing 1,3-butadiene using a dilithium hydrocarbon catalyst and copolymerizing the resulting active polybutadiene with styrene as described in U.S. Patent No. 3,265,765; and polystyrene/polybutadiene/polystyrene block copolymer of Y—X—Y type obtained by copolymerizing a monomeric mixture of 1,3-butadiene and styrene using a dilithium hydrocarbon catalyst.

In addition, there may be used a polystyrene/polybutadiene/polystyrene block copolymer having improved heat- and oil-resistances obtained by copolymerizing a major portion of polystyrene block with a minor portion of divinylbenzene.

Exemplary thermoplastic elastomers further include a block copolymer of $(X-Y)_n$ type comprising 1,3-butadiene and styrene obtained by copolymerizing a monomeric mixture of 1,3-butadiene and styrene using a monolithium hydrocarbon catalyst and additionally copolymerizing the resulting active copolymer with a monomeric mixture of 1,3-butadiene and styrene for required times; a block copolymer of $Y-(X-Y)_m$ type comprising 1,3-butadiene and styrene obtained by first polymerizing styrene using a monolithium hydrocarbon catalyst and copolymerizing the resulting active polystyrene with a monomeric mixture of 1,3-butadiene and styrene for required times; and a block copolymer of $(X-Y)_n-X$ type comprising 1,3-butadiene and styrene obtained by copolymerizing a monomeric mixture of 1,3-butadiene and styrene for required times using a monolithium hydrocarbon catalyst and further copolymerizing the resulting active copolymer with 1,3-butadiene.

Conjugated diolefins which may be used for the thermoplastic elastomers referred to herein are those having 4–6 carbon atoms including, for example, 1,3-butadiene, isoprene, 2,3-dimethyl-1,3-butadiene, 1,3-butadiene and the like.

Vinyl-substituted aromatic hydrocarbons which may be used for the thermoplastic elastomers referred to herein include, for example, styrene, vinyltoluene, vinylxylene, ethylstyrene, isopropylstyrene, ethylvinyltoluene, tert-butyl styrene, diethylstyrene, vinylnaphthalene, and the like.

In the thermoplastic elastomers substantially comprising conjugated diolefin blocks and vinyl-substituted aromatic hydrocarbon blocks referred to herein, the conjugated diolefin block may be replaced by blocks of random copolymer of styrene and 1,3-butadiene, that of styrene and isoprene or that of 1,3-butadiene and isoprene.

Also, a part of said vinyl-substituted aromatic hydrocarbon blocks constituting the thermoplastic elastomers referred to herein may be replaced by blocks of acrylonitrile, methyl methacrylate, chlorostyrene or the like.

In preparing the thermoplastic elastomers used in this invention, various alkali metal based catalysts, e.g. potassium, sodium, rubidium and cesium based catalysts, may be optionally chosen and conveniently used, in addition to the above-mentioned lithium based catalyst.

In the process of manufacturing the composite propellant of this invention, a fuel binder is first prepared by admixing 100 parts by weight of the above-mentioned thermoplastic elastomer, 20–100 parts by weight of a plasticizer compatible with said thermoplastic elastomer, 10–50 parts by weight of tackifier, and suitable amounts of conventional additives such as fluidizing agent, physical property modifier or stabilizers, if required, altogether and the resulting mix is kneaded under heating on a kneading roll or in a mixer such as Banbury mixer.

Then, 5–50 parts by weight, preferably 5–20 parts by weight, of the resulting fuel binder, 50–95 parts by weight, preferably 80–95 parts by weight, of an oxidizer, and suitable amounts of a reducing metal powder and additives such as burning rate modifier, if required are mixed together and kneaded at a temperature above 70° C., preferably 80–120° C. employing the mixer as mentioned above.

The resulting mix is suitably moulded in a mould or into a rocket motor casing, according to the conventional methods such as compression casting or injection moulding, or, alternatively, the mix may be shaped by extrusion, followed by cooling down to room temperature to obtain the composite propellant of this invention.

Plasticizers which may be used for preparing the fuel binder of this invention include various paraffinic, naphthenic or aromatic process oils, esters such as dialkyl phthalate, dialkyl adipate or dialkyl sebacate, liquid polyesters obtained from dicarboxylic acid and glycol, epoxy compounds of esters such as glycolate or glyceride of unsaturated aliphatic acids, tricresyl phosphate and the like, which are compatible with the thermoplastic elastomers.

Examples of tackifiers which may be used for the fuel binder referred to herein include, coumarone-indene resin, low molecular weight polybutadiene, petroleum resins, low molecular weight polyamide, low molecular weight polyphenol, low molecular weight polystyrene, polyepoxy resin and the like.

Particularly, in this invention, by the use of 10–50 parts by weight of tackifier per 100 parts by weight of the thermoplastic elastomer, adhesion between the oxidizer or other solid granular components and the elastomer is greatly enhanced. Thus, by the addition of 10–50 parts by weight of a tackifier per 100 parts by weight of the elastomer as set forth above, there may be obtained a composite propellant having excellent mechanical properties as illustrated in examples described hereinafter, in contrast with the fact that only a propellant having a tensile strength of less than 6 kg./cm.² and an effective tensile elongation of less than 20%, which cannot be said to be satisfactory mechanical properties, is obtained without using the tackifier.

Fluidizing agents which may be used in this invention include anionic surfactants having the general formula

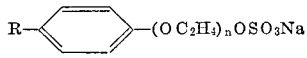

wherein R represents a hydrocarbon residue having 8–9 carbon atoms and $n$ is a value not less than 6, cationic surfactants of the general formula $$RCONHCH_2CH_2 \cdot N(C_2H_5)_2$$

wherein R represents a hydrocarbon residue having 17 carbon atoms, non-ionic surfactants of the general formula

wherein R represents a hydrocarbon residue having 12–14 carbon atoms and $n$ is a value not less than 6, and polyethylene having a molecular weight of several thousands to several tens of thousands.

Physical property modifiers referred to herein include, for example, channel or furnace carbon black.

Stabilizers which may be used in this invention include phenyl-β-naphthylamine, 2,2'-methylene-bis(4-ethyl-6-tert-butyl phenol) and many other stabilizers for rubber.

Examples of reducing metal powders referred to herein are powders of aluminium, beryllium, magnesium or the like.

Burning rate modifiers which may be used in this invention include Prussian blue, ammonium bichromate, ferric oxide, copper chromate and the like.

Typical examples of oxidizers conveniently used in this invention include ammonium perchlorate, perchlorates of various metals, ammonium nitrate, nitrates of various metals and organic nitro compounds.

In accordance with this invention, by the use of thermoplastic high polymemrs different fro those thermosetting high polymers employed heretofore as fuel binders, the composite propellants can be manufactured in a simple moulding operation as explained above without requiring any thermal curing process.

For example, when using carboxylated polybutadiene, which is a typical hydrocarbon thermosetting fuel binder employed heretofore, and tris[1-(2-methyl)aziridinyl] phosphine oxide, which is a typical curing agent therefor, a composite propellant is obtained by casting uncured slurry-like propellant into a mould, curing thus cast propellant under heating at 50–100° C. continuously for 3–10 days, and then cooling the same down to room temperature. Hence, a total of 3 to 10 and some odd days are required for the manufacturing of the propellant.

In contrast, in accordance with this invention, a shaped composite propellant having a desired configuration may be obtained in the matter of several hours by kneading and fluidizing the uncured propellant under heating above 70° C. on a heated mixing roll or in a Banbury mixer, casting thus fluidized propellant according to the conventional methods such as injection moulding or extrusion method, and cooling thus moulded propellant immediately. Thus, the present invention enables an increased manufacturing of composite propellants in a shorter period of time and the manufacturing cost per unit quantity of the product can be remarkably lowered.

The thermoplastic elastomers used in this invention have superior mechanical properties and rubbery elasticity over plasticized soft polyvinyl chloride which is a typical thermoplastic fuel binder used heretofore as shown in the following Table 1.

TABLE 1

| | Thermoplastic elastomer | Polyvinyl chloride |
|---|---|---|
| Tensile strength (kg./cm.²) | 240 | 110 |
| Elongation (percent) | 950 | 150 |
| 300% modulus (kg./cm.²) | 27 | -------- |
| Tension set (percent) | 20 | 80 |

In the above Table 1:

(1) The thermoplastic elastomer referred to is a butadiene/styrene block copolymer of $(X—Y)_2$ type having an average molecular weight of 100,000 and a styrene content of 40%, and containing no additive.

(2) The polyvinyl chloride referred to is a mixture of 100 parts by weight of hard polyvinyl chloride having a degree of polymerization of 1,100 and 70 parts by weight of dioctyl phthalate.

(3) The physical properties were measured according to ASTM D–412–61T.

Since the physical properties of the composite propellant are dependent upon those of fuel binder employed, it is readily appreciated that the mechanical properties of the composite propellant of this invention are far superior to those of the conventional propellants known heretofore using polyvinyl chloride as a fuel binder.

The thermoplastic elastomers used in this invention have equally superior tensile strength and elongation at low temperatures as compared with those of carboxylated polybutadiene fuel binder which has been considered to afford a thermoset propellant having an excellent low temperature characteristic, and they are capable of affording composite propellants usable in a wider temperature range.

The accompanying graph illustrates that the composite propellant of this invention containing the thermoplastic elastomer has a low temperature characteristic substantially the same as that of composite propellant containing the thermosetting resin known heretofore.

In the diagram, the abscissa designates temperatures, the left ordinate designates tensile strength (kg./cm.²) and the right ordinate designates elongation (percent). Referring to the diagram, the curves (1) and (3) indicate the tensile strength and elongation of a composite propellant of this invention containing the thermoplastic elastomer, prepared according to the following recipe:

| | Parts |
|---|---|
| Butadiene/styrene block copolymer, $(X—Y)_2$ type, having a molecular weight of 100,000 and a styrene content of 40% | 9 |
| Naphthenic process oil | 5 |
| Coumarone resin | 1 |
| Ammonium perchlorate | 85 |

The curves (2) and (4) show those of comparative thermoset propellant prepared according to the following recipe:

| | Parts |
|---|---|
| Carboxylated polybutadiene having a molecular weight of 4,000 | 13 |
| MAPO (Product of Interchemical Corp.)[1] | 1 |
| DOP[2] | 3 |
| Ammonium perchlorate | 83 |

[1] Tris [1-(2-methyl)aziridinyl]phosphine oxide.
[2] Dioctyl phthalate.

The composite propellant of this invention containing the thermoplastic elastomer as a fuel binder has an advantage in having a higher specific impulse than that of propellants containing polyvinyl chloride as fuel binders, since the molecules of the thermoplastic elastomer referred to above are composed of elements having smaller atomic weights as compared with those of polyvinyl chloride, and, in addition, the thermoplastic elastomer has larger heat of combustion than that of polyvinyl chloride as described hereinbefore.

The thermoplastic elastomer of this invention is a hydrocarbon compound essentially comprising reducing components. Thus, in order to oxidize the hydrocarbon compound completely stoichiometrically, a large amount of oxidizer must be compounded therewith. For example, when using ammonium perchlorate as an oxidizer, the required compounding ratio thereof is as high as 92% based on the weight of the resulting propellant.

In the manufacture of thermoset propellant according to the casting method adopted heretofore, it is necessary to maintain the fluidity of the material when casting, thus, the amount of solid oxidizer allowed to be incorporated thereinto is limited to 85% at the highest.

In contrast, in the propellant containing the thermoplastic elastomer as a fuel binder, the amounts of solid components to be incorporated may be conveniently selected in a wide range, e.g. as high as 90%, due to the fact that the propellant can be shaped by extrusion or injection moulding.

For the reasons described in the foregoing, the composite propellant of this invention exhibits a greater specific impulse over that of thermoplastic propellant containing polyvinyl chloride known heretofore, and that of thermoset propellant containing polybutadiene known heretofore.

The calculated values are shown in the following Table 2.

TABLE 2

| Type of propellant: | Theoretical specific impulse at 1000 p.s.i. |
|---|---|
| (1) Propellant containing thermoplastic elastomer of this invention | 267 |
| (2) Propellant containing thermosetting polybutadiene | 258 |
| (3) Propellant containing thermoplastic polyvinyl chloride | 240 |

In the above Table 2, the compositions of the (1) propellant containing thermoplastic elastomer of this invention, and the (2) propellant containing thermosetting polybutadiene are the same as those given in the explanation of the accompanying graph described hereinbefore. The composition of the (3) propellant containing thermoplastic polyvinyl chloride referred to above is as follows:

| | Parts |
|---|---|
| Hard polyvinyl chloride | 11 |
| DOP (Dioctyl phthalate) | 8 |
| Ammonium perchlorate | 81 |

DESCRIPTION OF THE PREFERRED EMBODIMENTS

The following examples will illustrate this invention more fully and practically.

Example 1

100 parts by weight of a thermoplastic elastomer, more particularly, a polystyrene/polybutadiene/polystyrene block copolymer having an average molecular weight of 80,000 and a styrene content of 40% by weight, 100 parts by weight of naphthenic process oil as a plasticizer and 30 parts by weight of coumarone-indene resin are mixed together and melt kneaded at 80° C.

To 20 parts by weight of the resulting mix were added 80 parts by weight of powdered ammonium perchlorate and 5 parts by weight of powdered aluminum and, after a thorough kneading, the resulting mix was shaped into a cylindrical configuration by using an extruder.

The thermoplastic elastomer referred to herein was prepared by subjecting a 15% by weight n-hexane solution containing 9.5 kg. of a monomeric mixture consisting of 1,3-butadiene and styrene in a weight ratio of 40:60 to a copolymerization reaction under nitrogen atmosphere using 0.35 mol of n-butyllithium calculated as an active lithium at 60° C. for 4 hours, then, after more than 99% of the total monomers were copolymerized, further subjecting the resulting active copolymer solution to a copolymerization reaction by adding a 15% by weight n-hexane solution containing 19 kg. of a monomeric mixture consisting of 1,3-butadiene and styrene in a weight ratio of 70:30 thereto, first at 70° C. for 4 hours and then at 85° C. for an hour, and, after substantially whole amount of the supplemented monomeric mixture was copolymerized, adding 285 g. of phenyl-$\beta$-naphthylamine thereto, followed by drying the final copolymer to give the desired thermoplastic elastomer.

The resulting shaped propellant had good mechanical properties including a tensile strength of 8 kg./cm.$^2$ and an elongation of 30%, as well as a good rubbery elasticity, and it was combusted stably in a rocket motor.

Example 2

A thermoplastic elastomer of a 1,3-butadine/styrene block copolymer having an average molecular weight of 100,000 and a styrene content of 40% by weight was obtained by subjecting a 15% by weight n-hexane solution containing 600 g. of 1,3-butadiene to the polymerization reaction using 0.025 mol of dilithium-1,2-diphenyl ethylene calculated as an active lithium at 50° C. for 4 hours, then, after substantially all of the 1,3-butadiene was polymerized, further subjecting the resulting active polymer solution to a copolymerization reaction by adding a 15% by weight n-hexane solution containing 400 g. of styrene thereto at 55° C. for 2 hours, and adding 10 g. of phenyl-$\beta$-naphthylamine thereto.

100 parts by weight of the thermoplastic elastomer thus obtained, 100 parts by weight of a paraffinic process oil and 20 parts by weight of coumarone-indene resin were melt kneaded at 80° C. Then, 25 parts by weight of the resulting mix and 75 parts by weight of ammonium perchlorate were kneaded and the resulting mix was shaped according to a compression casting method by pouring the resulting mix with compression into a cylindrical mould maintained at a reduced pressure of 1 mm. Hg.

The resulting shaped propellant had good mechanical properties including a tensile strength of 6 kg./cm.$^2$ and an elongation of 25%, as well as a good rubbery elasticity, and it was combusted in a stable manner.

Example 3

A thermoplastic elastomer comprising isoprene and styrene and having an average molecular weight of 153,000 and a styrene content of 40% by weight was obtained by subjecting a 15% by weight cyclohexane solution containing 4 kg. of styrene to a polymerization reaction under a nitrogen atmosphere using 130 mmol of n-butyllithium calculated as an active lithium at 45° C. for 4 hours, then, after more than 99% of styrene was polymerized, further subjecting the reuslting active polystyrene solution to a copolymerization reaction by adding a 15% by weight cyclohexane solution containing 12 kg. of isoprene at 55° C. for 3 hours, then, after substantially whole amount of isoprene was copolymerized, still further subjecting the resulting active copolymer solution to a copolymerization reaction by adding a 15% by weight cyclohexane solution containing 4 kg. of styrene at 60° C. for 3 hours, and adding 200 g. of phenyl-$\beta$-naphthylamine thereto after completion of the copolymerization, followed by drying the final polymer.

100 parts by weight of the thermoplastic elastomer thus obtained, 100 parts by weight of a naphthenic process oil, and 30 parts of coumarone-indene resin were melt kneaded at 80° C. Then, 20 parts by weight of the resulting mix, 80 parts by weight of ammonium perchlorate and 5 parts by weight of powdered aluminium were compounded together and shaped at 80° C. by using an extruder.

The resulting shaped propellant had good mechanical properties including a tensile strength of 13 kg./cm.$^2$ and an elongation of 40%, as well as a good rubbery elasticity, and it was combusted in a stable manner.

Example 4

A highly heat- and oil-resistant thermoplastic elastomer comprising 1,3-butadiene, styrene and divinylbenzene and having an average molecular weight of 80,000 and a styrene content of 40% by weight was obtained by subjecting a 15% by weight n-hexane solution containing 9.5 kg. of a monomeric mixture consisting of 1,3-butadiene, styrene and divinylbenzene in a weight ratio of 40:60:0.075, said divinylbenzene being a mixture of m- and p-isomers in a weight ratio of 80:20, to a copolymerization reaction under a nitrogen atmosphere using 0.50 mol of sec-butyl-lithium calculated as an active lithium at 60° C. for 4 hours, then, after more than 99% of the total monomers were copolymerized, further subjecting the resulting active copolymer solution to a copolymerization reaction by adding a 15% by weight n-hexane solution containing 19.0 kg. of a monomeric mixture consisting of 1,3-butadiene, styrene and divinylbenzene in a weight ratio of 70:30:0.0375, said divinylbenzene being a mixture of m- and p-isomers in a weight ratio of 80:20, thereto first at 70° C. for 4 hours and then at 85° C. for an hour, and, after substantially whole of the supplemented monomers were copolymerized, adding 285 g. of phenyl-$\beta$-naphthylamine as a stabilizer thereto followed by drying the final polymer.

100 parts by weight of the thermoplastic elastomer thus obtained, 100 parts by weight of a naphthenic process oil and 20 parts by weight of coumarone-indene resin were melt kneaded at 80° C. Then, 20 parts by weight of the resulting mix and 80 parts by weight of ammonium perchlorate were compounded and kneaded at 80° C. and shaped by using an extruder.

The resulting shaped propellant had a tensile strength of 10 kg./cm.$^2$ and an elongation of 30%, showing a good rubbery elasticity and it was combusted in a stable manner.

Example 5

A thermoplastic elastomer comprising 1,3-butadiene and styrene and having an average molecular weight of 130,000 and a styrene content of 40% by weight was obtained by subjecting a 15% by weight n-hexane solution containing 9.5 kg. of a monomeric mixture consisting of 1,3-butadiene and styrene in a weight ratio of 40:60 to a copolymerization reaction using 220 mmol of n-butyllithium calculated as an active lithium under a nitrogen atmosphere at 60% C. for 4 hours, then, after more than 99% of the total monomers were copolymerized, further subjecting the resulting active copolymer solution to a copolymerization reaction by adding a 15% by weight n-hexane solution containing 19.0 kg. of a monomeric mixture consisting of 1,3-butadiene and styrene in a weight ratio of 70:30, first at 70° C. for 4 hours and then at 85° C. for an hour, and, after substantially whole of the monomers supplemented were copolymerized, adding 285 g. of phenyl-$\beta$-naphthylamine thereto as a stabilizer followed by drying the final polymer.

100 parts of the thermoplastic elastomer thus obtained, 100 parts by weight of a naphthenic process oil and 30 parts by weight of coumarone-indene resin were compounded together. Then, 25 parts by weight of the resulting mix were heat melted and compounded with 80 parts by weight of ammonium perchlorate and, after a thorough kneading, the mix was shaped into a cylindrical configuration while removing bubbles therefrom by using an extruder.

The resulting shaped propellant had good mechanical properties including a tensile strength of 15 kg./cm.$^2$ and an elongation of 40%, as well as a good rubbery elasticity, and it was combusted in a stable manner.

Example 6

Isoprene (I) and styrene (S) were copolymerized by using n-butyllithium as a catalyst under a nitrogen atmosphere and there were obtained copolymers of I-S-I-S-I type and S-I-S-I-S type.

The average molecular weights and styrene contents of these copolymers were 80,000 and 40% by weight, respectively.

The shaped propellants were prepared using these copolymers according to the same procedures and recipe as described in Example 5.

The mechanical properties of the resulting propellants were as follows and they showed a good rubbery elasticity and were combusted in a stable manner:

|  | I-S-I-S-I type | S-I-S-I-S type |
| --- | --- | --- |
| Tensile strength (kg./cm.$^2$) | 12 | 10 |
| Elongation (percent) | 35 | 30 |

We claim:
1. A composite propellant comprising a fuel binder, a solid inorganic oxidizer or an organic nitro compound oxidizer, said fuel binder comprising a thermoplastic elastomer which is a block copolymer comprising conjugated diolefin blocks and vinyl-substituted aromatic hydrocarbon blocks and having a general formula selected from the group consisting of $(X-Y)_n$, $(X-Y)_n-X$ and $Y-(X-Y)_m$, wherein X represents a conjugated diolefin block, Y represents a vinyl-substituted aromatic hydrocarbon block, $n$ is an integer of 2–10, inclusive, and $m$ is an integer of 1–10, inclusive.

2. The composite propellant of claim 1 wherein said conjugated diolefin block is at least one member selected from the group consisting of 1,3-butadiene, isoprene, 2,3-dimethyl-1,3-butadiene, and 1,3-pentadiene blocks.

3. The composite propellant of claim 1 wherein said vinyl-substituted aromatic hydrocarbon block is at least one member selected from the group consisting of styrene, vinyltoluene, vinylxylene, ethylstyrene, isopropylstyrene, ethylvinyltoluene, tert-butylstyrene, diethylstyrene, vinylnaphthalene and divinylbenzene.

4. The composite propellant of claim 1 wherein said fuel binder comprises said thermoplastic elastomer in a mixture of 100 parts by weight of said thermoplastic elastomer, 20–100 parts by weight of a plasticizer, and 10–50 parts by weight of a tackifier.

5. The composite propellant of claim 4 wherein said plasticizer is at least one member selected from the group consisting of a process oil, an ester, a liquid polyester, an epoxidated ester and tricresyl phosphate.

6. The composite propellant of claim 5 wherein said process oil is a member selected from the group consisting of paraffinic, naphthenic and aromatic process oils, said ester is a member selected from the group consisting of dialkyl phthalate, dialkyl adipate and dialkyl sebacate, said liquid polyester is one obtained from dicarboxylic acid and glycol, said epoxidated ester is an epoxy compound of an ester selected from the group consisting of glycolate and glyceride of unsaturated aliphatic acid.

7. The composite propellant of claim 4 wherein said tackifier is at least one member selected from the group consisting of coumarone-indene resin, low molecular weight polybutadiene, petroleum resin, low molecular weight polyamide, low molecular weight polyphenol, low molecular weight polystyrene and epoxy resin.

8. A process for manufacturing a composite propellant which comprises mixing 5–50 parts by weight of a fuel binder comprising a thermoplastic elastomer which is a block copolymer comprising conjugated diolefin blocks and vinyl-substituted aromatic hydrocarbon blocks and having a general formula selected from the group consisting of $(X—Y)_n$, $(X—Y)_n—X$, $Y—(X—Y)_m$, wherein X represents a conjugated diolefin block, Y represents a vinyl-substituted aromatic hydrocarbon block, $n$ is an integer of 2–10, inclusive, and $m$ is an integer of 1–10, inclusive, 50–95 parts by weight of a solid inorganic oxidizer or an organic nitro compound oxidizer, heating, kneading the resulting mix and shaping the thus kneaded mix.

9. A composite propellant of claim 1, wherein the oxidizer is selected from the group consisting of ammonium perchlorate, a metal perchlorate, ammonium nitrate, a metal nitrate and an organic nitro compound.

10. A composite propellant of claim 1, wherein said thermoplastic polymer has an average molecular weight from about 10,000 to about 500,000 and contains from about 10 to about 70 percent by weight of said vinyl-substituted aromatic hydrocarbon blocks.

References Cited

UNITED STATES PATENTS

| | | | |
|---|---|---|---|
| 3,030,346 | 4/1966 | Cooper | 260—880 |
| 3,238,173 | 3/1966 | Bailey et al. | 260—880 |
| 3,242,021 | 3/1966 | D'Alelio | 149—19 |
| 3,265,765 | 8/1966 | Holden et al. | 260—880 |
| 3,293,289 | 12/1966 | Butler et al. | 149—19 X |
| 3,305,523 | 2/1967 | Burnside | 149—19 X |

BENJAMIN R. PADGETT, Primary Examiner

U.S. Cl. X.R.

149—44